(12) United States Patent
Duffy et al.

(10) Patent No.: US 8,190,624 B2
(45) Date of Patent: May 29, 2012

(54) DATA PARALLEL PRODUCTION AND CONSUMPTION

(75) Inventors: John Duffy, Renton, WA (US); Edward G. Essey, Seattle, WA (US); Charles D. Callahan, II, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 723 days.

(21) Appl. No.: 11/947,569

(22) Filed: Nov. 29, 2007

(65) Prior Publication Data

US 2009/0144228 A1 Jun. 4, 2009

(51) Int. Cl.
*G06F 7/00* (2006.01)
*G06F 17/30* (2006.01)

(52) U.S. Cl. .................................... 707/764; 718/104

(58) Field of Classification Search .................. None
See application file for complete search history.

(56) References Cited

U.S. PATENT DOCUMENTS

| | | | |
|---|---|---|---|
| 5,341,476 A * | 8/1994 | Lowell | 709/219 |
| 5,535,408 A | 7/1996 | Hillis | |
| 5,680,645 A | 10/1997 | Russell et al. | |
| 5,692,182 A * | 11/1997 | Desai et al. | 1/1 |
| 5,696,897 A | 12/1997 | Dong | |
| 5,790,868 A | 8/1998 | Hotea et al. | |
| 5,819,021 A | 10/1998 | Stanfill et al. | |
| 5,857,180 A | 1/1999 | Hallmark et al. | |
| 6,055,558 A * | 4/2000 | Lin et al. | 718/100 |
| 6,493,741 B1 * | 12/2002 | Emer et al. | 718/107 |
| 6,625,593 B1 * | 9/2003 | Leung et al. | 1/1 |
| 6,643,556 B1 * | 11/2003 | Morenz et al. | 700/106 |
| 6,738,974 B1 | 5/2004 | Nageswaran et al. | |
| 6,826,752 B1 * | 11/2004 | Thornley et al. | 718/100 |
| 6,834,387 B2 | 12/2004 | Jeyachandran et al. | |
| 6,848,033 B2 * | 1/2005 | Joseph | 711/147 |
| 7,080,101 B1 * | 7/2006 | Watson et al. | 1/1 |
| 7,103,590 B1 * | 9/2006 | Murthy et al. | 1/1 |
| 7,191,444 B2 | 3/2007 | Alverson et al. | |
| 2003/0004774 A1 * | 1/2003 | Greene et al. | 705/8 |
| 2003/0229640 A1 * | 12/2003 | Carlson et al. | 707/100 |
| 2004/0138981 A1 * | 7/2004 | Ehlers et al. | 705/36 |
| 2005/0039185 A1 | 2/2005 | Heidari-Bateni et al. | |
| 2005/0132383 A1 * | 6/2005 | Ghosh et al. | 719/312 |
| 2005/0155034 A1 * | 7/2005 | Jiang et al. | 718/106 |
| 2005/0192978 A1 * | 9/2005 | Lightstone et al. | 707/100 |
| 2006/0031839 A1 * | 2/2006 | Kang | 718/102 |
| 2006/0080285 A1 * | 4/2006 | Chowdhuri | 707/3 |
| 2006/0117316 A1 * | 6/2006 | Cismas et al. | 718/103 |
| 2006/0190482 A1 | 8/2006 | Kishan et al. | |
| 2006/0218123 A1 * | 9/2006 | Chowdhuri et al. | 707/2 |
| 2006/0277391 A1 | 12/2006 | Bittner, Jr. | |
| 2007/0016587 A1 * | 1/2007 | Ranger et al. | 707/10 |

(Continued)

OTHER PUBLICATIONS

DB2 Query Parallelism: Staging and Implementation, Wang et al, Proceedings of the 21st VLDB Conference, Zurich, Swiizerland, 1995.*

(Continued)

*Primary Examiner* — Pierre Vital
*Assistant Examiner* — Augustine Obisesan (57) ABSTRACT

A parallel execution of a query is performed with a plurality of producers using a partitioned data source, thereby producing output data. The output data is consumed with at least one consumer. The at least one consumer is monitored. A determination is made whether to stop producing output data by at least one of the producers prior to completion of the execution of the query based on the monitoring.

18 Claims, 6 Drawing Sheets

U.S. PATENT DOCUMENTS

| | | | | |
|---|---|---|---|---|
| 2007/0038658 | A1* | 2/2007 | Ghosh | 707/101 |
| 2007/0083588 | A1 | 4/2007 | Keller et al. | |
| 2007/0192296 | A1* | 8/2007 | Burger et al. | 707/3 |
| 2007/0198983 | A1* | 8/2007 | Favor et al. | 718/104 |
| 2007/0261057 | A1* | 11/2007 | Dearth et al. | 718/104 |
| 2008/0059405 | A1* | 3/2008 | Barsness et al. | 707/2 |
| 2008/0059407 | A1* | 3/2008 | Barsness et al. | 707/2 |
| 2008/0071759 | A1* | 3/2008 | Santosuosso | 707/4 |
| 2008/0104041 | A1* | 5/2008 | Bjornson et al. | 707/3 |

OTHER PUBLICATIONS

Dynamic query scheduling in data integration systems, Bouganim et al, IEEE 2000.*

Dynamic query scheduling in parallel datawarehouse, Martens et al, COncurrency and computation: practice and experience, 2003.*

Buffer Management Based on Return on Consumption in a Multi-Query Environment, Yu et al, Journal of VLDB, 2, pp. 1-37, 1993.*

An Adaptive Partitioning Operator for Continuous Query System, Shah et al, Proceeding of the 19th International Conference on Data Engineering (ICDE), 2003.*

QPipe: A simultaneously Pipelined Relational Query Engine, Harizopoulos et al, SIGMOD, pp. 383-394, 2005.*

Eckstein, et al., "PICO: An Object-Oriented Framework for Branch and Bound", Date: Dec. 2000, pp. 1-64.

Iqbal, et al., "Conversations amidst Computing: A Study of Interruptions and Recovery of Task Activity", pp. 1-5.

Krakowiak, "Middleware Architecture with Patterns and Frameworks", Date: Sep. 19, 2007, pp. 1-312.

Shavit, et al., "Elimination Trees and the Construction of Pools and Stacks", Date: Feb. 28, 1996, pp. 1-30.

International Search Report and Written Opinion Received for PCT Application No. PCT/US2008/083681, mailed on Jun. 30, 2009, 11 pages.

* cited by examiner

DATA PARALLEL PRODUCTION AND CONSUMPTION

BACKGROUND

Software programs have been written to run sequentially since the beginning days of software development. Steadily over time, computers have become much more powerful, with more processing power and memory to handle advanced operations. This trend has recently shifted away from ever-increasing single-processor clock rates towards an increase in the number of processors available in a single computer resulting in a corresponding shift away from sequential execution toward parallel execution. Software developers want to take advantage of improvements in computer processing power to enable their software programs to run faster as new hardware is adopted. With parallel hardware, software developers arrange for one or more tasks of a particular software program to be executed in parallel (also referred to as concurrently), so that the same logical operation can utilize many processors at one time to thereby deliver better performance as more processors are added to the computers on which such software runs.

When parallelizing previously-written sequential algorithms, it is often desirable to keep as much of the previous sequential program behavior as possible. However, typical parallel execution of existing sequential logic introduces new behavioral characteristics and presents problems that can introduce challenges into the migration from sequential to parallel algorithms.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

In one embodiment, a parallel execution of a query is performed with a plurality of producers using a partitioned data source, thereby producing output data. The output data is consumed with at least one consumer. The consumer(s) is/are monitored. A determination is made whether to stop producing output data by at least one of the producers prior to completion of the execution of the query based on the monitoring. A cancellation of the producers is performed when monitoring has determined that no consumers will no longer consume any more output data. At least one of the producers is placed in a quiescent state when the monitoring indicates that the at least one consumer has stopped consuming output data for more than a threshold period of time. Producers in a quiescent state exit the quiescent state and resume producing output data when the at least one consumer resumes consuming output data.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

One embodiment provides an application that performs cancellation, quiescence, and resumption functions for data parallel operations, but the technologies and techniques described herein also serve other purposes in addition to these. In one implementation, one or more of the techniques described herein can be implemented as features within a framework program such as MICROSOFT®.NET Framework, or within any other type of program or service that handles data parallel operations in programs.

Data parallel systems typically operate by partitioning input data into disjoint subsets (partitions) so that independent tasks of execution may process the separate subsets in isolation. The partitions are processed in parallel to generate a plurality of output sets (e.g., a query is executed in parallel using the plurality of partitions as input). The output sets are merged back into a merged output set.

Certain data parallelism problems can be viewed in terms of a producer/consumer relationship. Some systems use data parallelism to produce data from a plurality of parallel producers, and this data is then consumed by a separate agent (e.g., one or more consumers). Sometimes this consumer runs concurrently with the producers and the production of the data.

If the consumer runs concurrently with the data production, the consumer may do one of several things. The consumer could consume all of the output, none of the output, or some of the output. The consumer may decide to stop consuming output for any number of reasons, including: some logic that decides to stop; a (possibly unexpected) exception; the consumer may be aborted by an outside agent (e.g., due to an AppDomain unload); or other reasons.

When a consumer stops consuming output data, problems can arise. The production of that data has already been initiated, and there are, therefore, resources dedicated to making it happen efficiently. The production may involve several threads running code, buffering output in memory, and using hardware and other system resources. If a consumer stops taking output, some of these producer threads may end up blocked (e.g., if bounded buffers or other synchronization mechanisms are used).

In one embodiment, a cancellation request is generated that causes producers to stop using resources in certain situations (e.g., when it is determined that a consumer will no longer consume any more output data), and quiescence and resumption operations are provided so that even in the case that explicit cancellation is not requested, the system will not use such resources indefinitely. In one embodiment, the cancellation functionality is integrated up and down the data parallel engine. Quiescence, according to one embodiment, means that data parallel producers that are in mid-execution are configured to continuation transform themselves to stop the producers from using system resources (e.g., the producers turn themselves into continuations, which are objects that are stored on the heap and represent an in-progress, resumable computation). The producers that have transformed themselves into continuations are also referred to herein as producers in a quiescent state, sleep state, or suspended state. In one implementation, on-demand resumption of these continuations is provided in such a manner that a consumer that comes back to processing data need not know about the quiescence. Automatic heuristics-based initiation of the quiescence and resumption activities is used in one embodiment, with the initiation being based on producer/consumer relationships and other configurable parameters.

Figure 1:
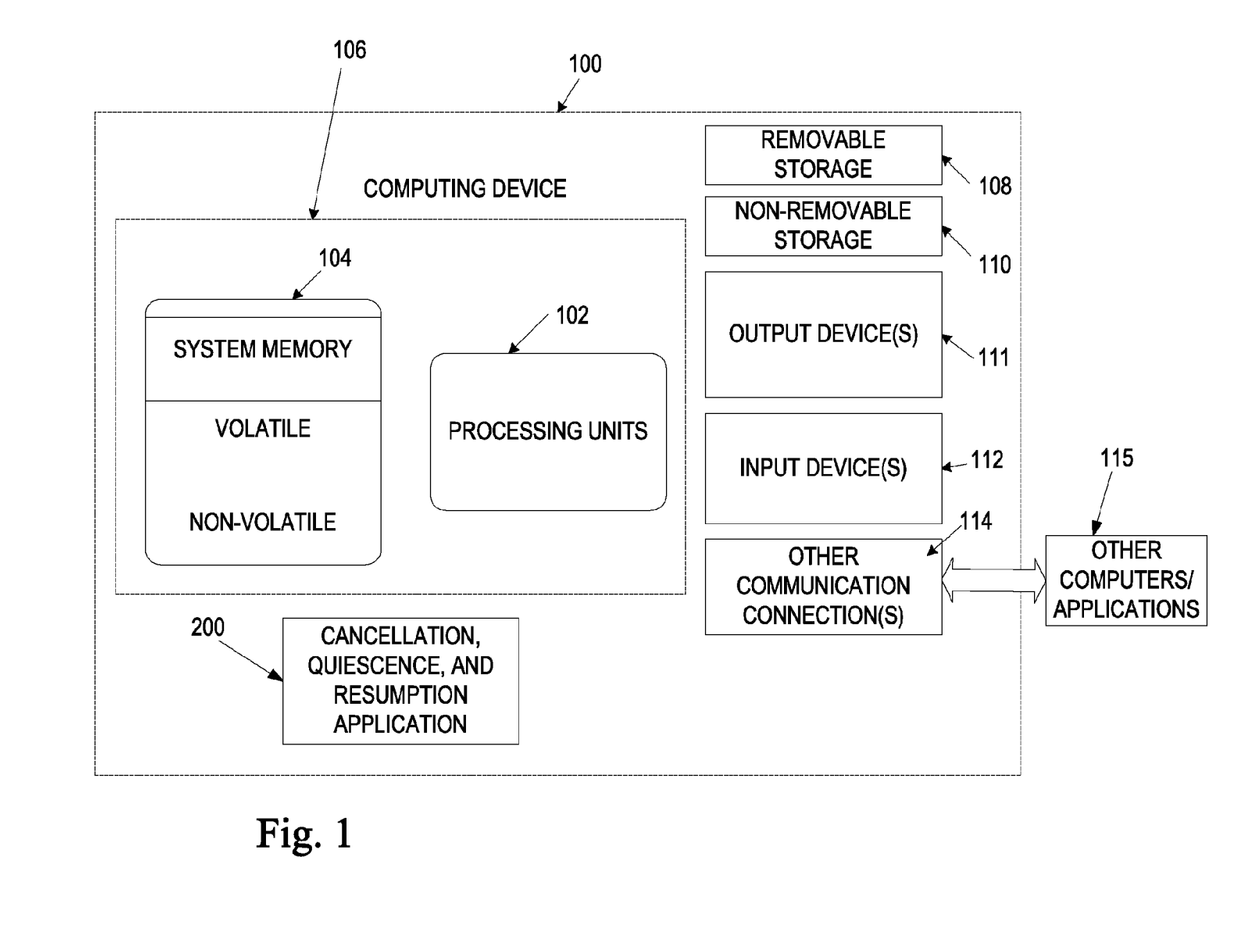
FIG. 1 is a block diagram illustrating a computer system according to one embodiment.

As illustrated in FIG. 1, an exemplary computer system that can be employed to implement one or more parts of an example system includes a computing device, such as computing device 100. In a basic configuration, computing device 100 typically includes processing units (i.e., processors) 102 and memory 104. Depending on the exact configuration and type of computing device, memory 104 may be volatile (such as RAM), non-volatile (such as ROM, flash memory, etc.), or some combination of the two. This basic configuration is illustrated in FIG. 1 by dashed line 106.

Computing device 100 may also have additional features/functionality. For example, computing device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by computing device 100. Any such computer storage media may be part of computing device 100.

Computing device 100 includes one or more communication connections 114 that allow computing device 100 to communicate with other computers/applications 115. Computing device 100 may also include input device(s) 112, such as keyboard, pointing device (e.g., mouse), pen, voice input device, touch input device, etc. Computing device 100 may also include output device(s) 111, such as a display, speakers, printer, etc.

In one implementation, computing device 100 includes cancellation, quiescence, and resumption application 200. Cancellation, quiescence, and resumption application 200 is described in further detail below with reference to FIG. 2.

Figure 2:
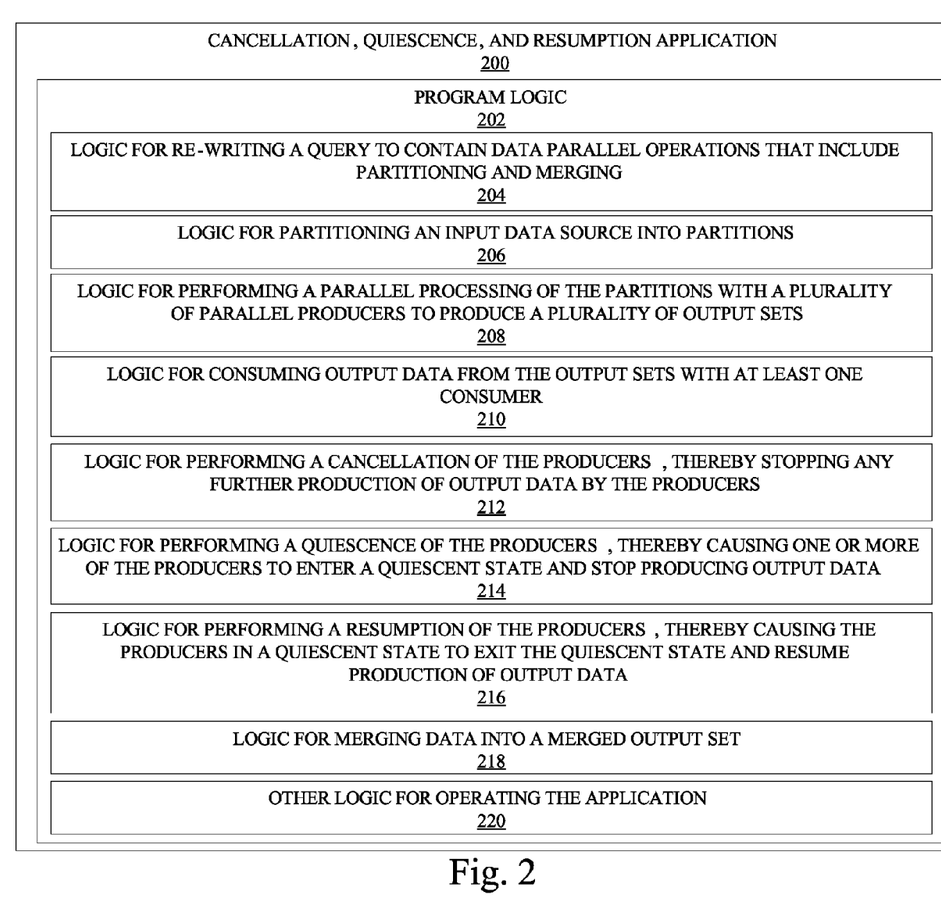
FIG. 2 is a diagrammatic view of a cancellation, quiescence, and resumption application for operation on the computer system illustrated in FIG. 1 according to one embodiment.

FIG. 2 is a diagrammatic view of one embodiment of a cancellation, quiescence, and resumption application 200 for operation on computer device 100 illustrated in FIG. 1. Cancellation, quiescence, and resumption application 200 is one of the application programs that reside on computing device 100. However, cancellation, quiescence, and resumption application 200 can alternatively or additionally be embodied as computer-executable instructions on one or more computers and/or in different variations than illustrated in FIG. 1. Alternatively or additionally, one or more parts of cancellation, quiescence, and resumption application 200 can be part of system memory 104, on other computers and/or applications 115, or other such suitable variations as would occur to one in the computer software art.

Cancellation, quiescence, and resumption application 200 includes program logic 202, which is responsible for carrying out some or all of the techniques described herein. Program logic 202 includes logic for re-writing a query to contain data parallel operations that include partitioning and merging 204; logic for partitioning an input data source into partitions 206; logic for performing a parallel processing of the partitions with a plurality of parallel producers to produce a plurality of output sets 208; logic for consuming output data from the output sets with at least one consumer 210; logic for performing a cancellation of the producers, thereby stopping any further production of output data by the producers 212; logic for performing a quiescence of the producers, thereby causing one or more of the producers to enter a quiescent state and stop producing output data 214; logic for performing a resumption of the producers, thereby causing the producers in a quiescent state to exit the quiescent state and resume production of output data 216; logic for merging data into a merged output set 218; and other logic for operating the application 220.

Turning now to FIGS. 3-11 with continued reference to FIGS. 1-2, methods for implementing one or more implementations of cancellation, quiescence, and resumption application 200 are described in further detail. In some implementations, the methods illustrated in FIGS. 3-11 are at least partially implemented in the operating logic of computing device 100.

Figure 3:
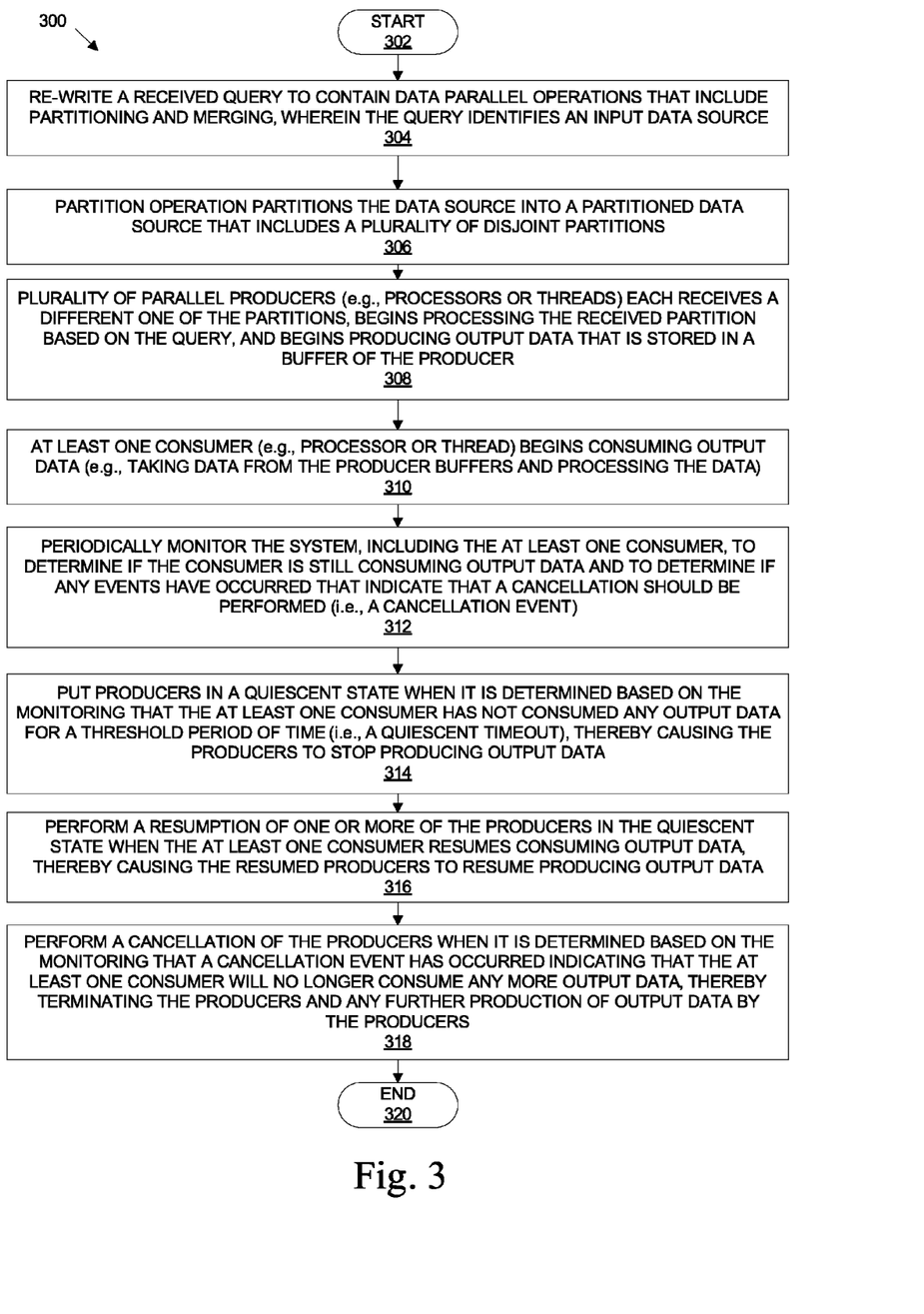
FIG. 3 is a high level flow diagram illustrating a method for performing cancellation, quiescence, and resumption functions for data parallel operations according to one embodiment.

FIG. 3 is a high level flow diagram illustrating a method 300 for performing cancellation, quiescence, and resumption functions for data parallel operations according to one embodiment. Method 300 begins at start point 302. At 304, a query is received and is re-written to contain data parallel operations that include partitioning and merging, wherein the query identifies an input data source. At 306, a partition operation partitions the data source into a partitioned data source that includes a plurality of disjoint partitions. At 308, a plurality of parallel producers (e.g., processors or threads) each receives a different one of the partitions, begins processing the received partition based on the query, and begins producing output data that is stored in a buffer of the producer. Thus, at 308, a parallel execution of a query is performed with a plurality of producers using a partitioned data source. At 310, at least one consumer (e.g., processor or thread) begins consuming output data (e.g., taking data from the producer buffers and processing the data).

At 312 in method 300, the system, including the at least one consumer, is periodically monitored to determine if the consumer is still consuming output data and to determine if any events have occurred that indicate that a cancellation should be performed (i.e., a cancellation event). At 314, the producers are put into a quiescent state when it is determined based on the monitoring at 312 that the at least one consumer has not consumed any output data for a threshold period of time (i.e., a QuiescentTimeout period), thereby causing the producers to stop producing output data. At 316, a resumption of one or more of the producers in the quiescent state is performed when the at least one consumer resumes consuming output data, thereby causing the resumed producers to resume producing output data. At 318, a cancellation of the producers is performed when it is determined based on the monitoring at 312 that a cancellation event has occurred indicating that the at least one consumer will no longer consume any more output data, thereby terminating the producers and any further production of output data by the producers. Method 300 ends at end point 320.

As mentioned above, at 308 in method 300, each of the producers begins producing output data that is stored in a buffer of the producer. In one implementation, the producer buffers are bounded to help ensure that partitions do not get "too far ahead". The bounded buffers help control the rate of production (and memory usage) in case the consumer is consuming at a rate that is much less than the rate of production, which is particularly beneficial when querying an infinite data source. If the consumer is consuming output data slowly, or stops consuming output data, the producers become blocked due to the bounded buffers, waiting to output additional data from the query. When producers are blocked and are not taking any action, numerous operating system resources are being wasted, or are not being used as efficiently as they could be. Method 300 according to one embodiment provides a more efficient use of system resources by monitoring the consumer, and based on what the consumer is doing, performing cancellation, quiescence, and resumption operations.

One embodiment of method 300 will now be described in further detail with reference to two example queries. As a first example, assume that the following query is received at 304: for each (var e in q) {a(e); throw new Exception( );}. In this example, an exception is thrown after the first action, and the loop is exited. The exception causes the consumer to no longer consume any more output data. The exception is a cancellation event that will be detected at 312 in method 300, and based on the detected exception, a cancellation of the producers occurs at 318.

As a second example, assume that the following query is received at 304: for each (var e in q) {a(e); Sleep (1000*60*60);}. In this example, the consumer sleeps for an hour after consuming each output element. In one embodiment, the method 300 will determine at 314 that the consumer has not consumed any output data for the threshold period of time, and the producers will enter a quiescent state.

In both of the above examples, method 300 frees up the operating system resources dedicated to the production. In the first example, method 300 does this as soon as the exception is detected, and in the second example, this occurs after the threshold period of time has expired. In one embodiment, the threshold period of time is a configurable, heuristics-based, period of time.

Figure 4:
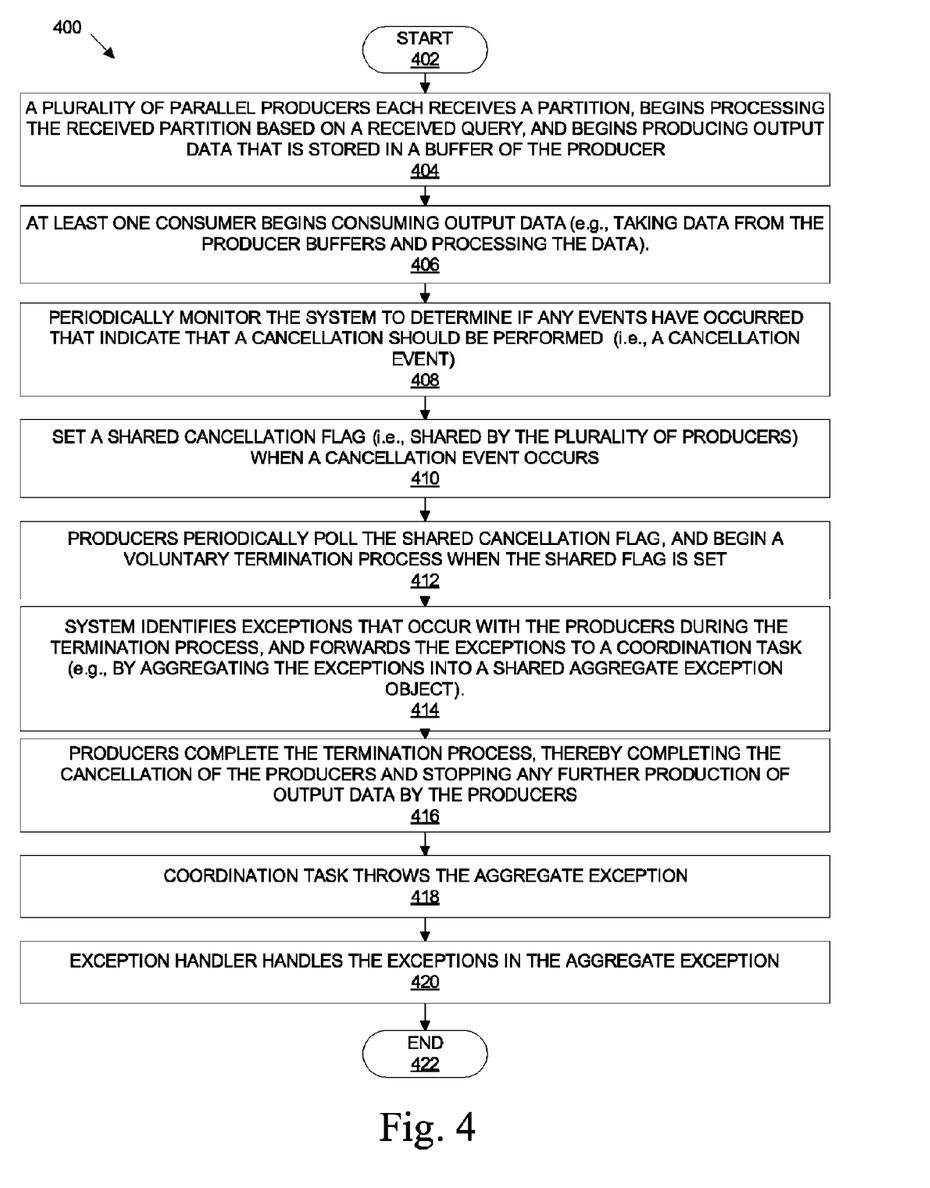
FIG. 4 is a flow diagram illustrating a method for performing a cancellation of producers according to one embodiment.

FIG. 4 is a flow diagram illustrating a method 400 for performing a cancellation of producers according to one embodiment. Method 400 begins at start point 402. At 404, a plurality of parallel producers each receives a partition, begins processing the received partition based on a received query, and begins producing output data that is stored in a buffer of the producer. At 406, at least one consumer begins consuming output data (e.g., taking data from the producer buffers and processing the data). At 408, the system is periodically monitored to determine if any events have occurred that indicate that a cancellation should be performed (i.e., a cancellation event). At 410, a shared cancellation flag (i.e., shared by the plurality of producers) is set when a cancellation event occurs. At 412, the producers periodically poll the shared cancellation flag, and begin a voluntary termination process when the shared flag is set. At 414, the system identifies exceptions that occur with the producers during the termination process, and forwards the exceptions to a coordination task (e.g., by aggregating the exceptions in a shared aggregate exception object). At 416, the producers complete the termination process, thereby completing the cancellation of the producers and stopping any further production of output data by the producers. At 418, the coordination task throws the aggregate exception. At 420, an exception handler handles the exceptions in the aggregate exception. Method 400 ends at end point 422.

Figure 5:
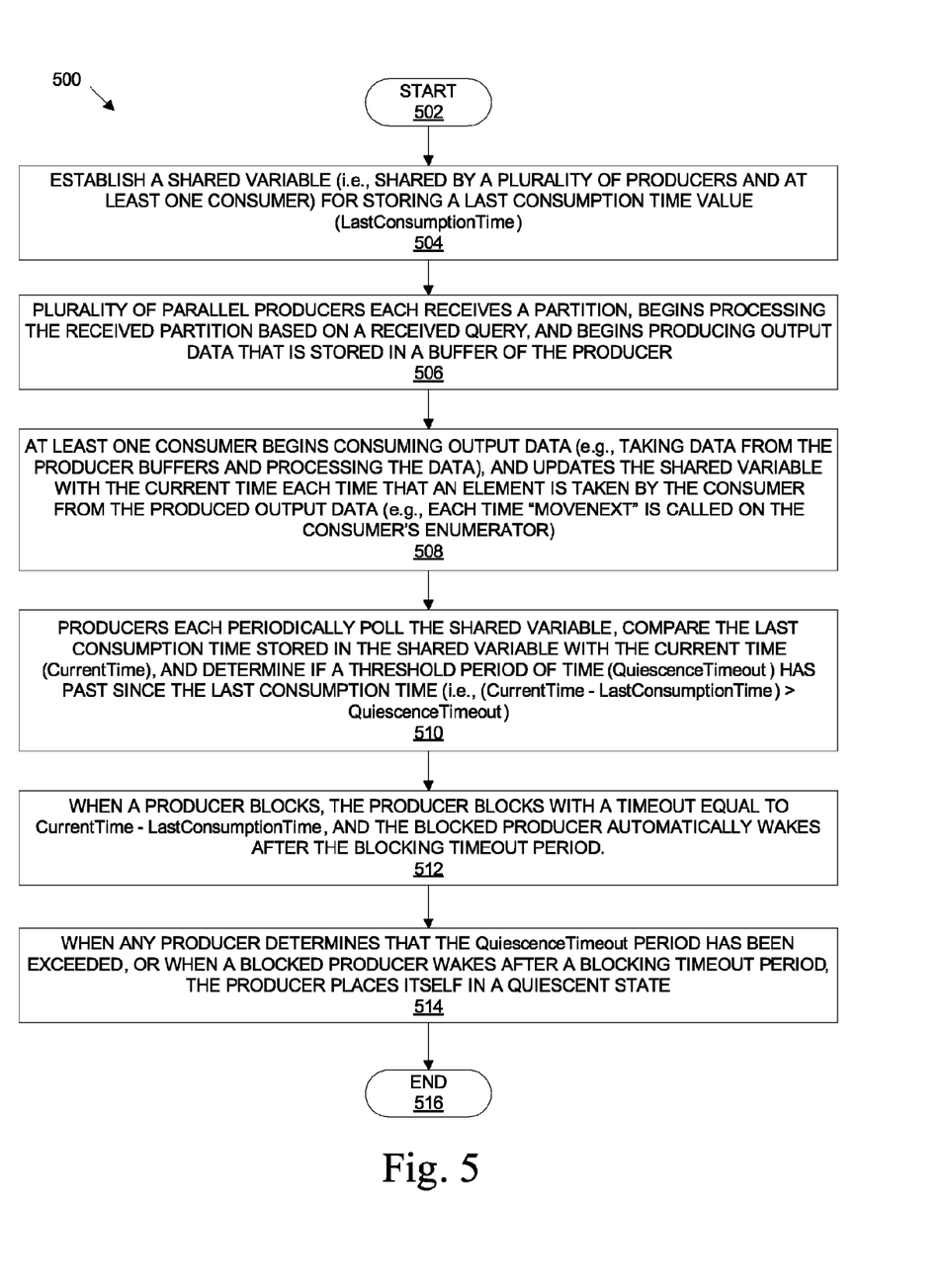
FIG. 5 is a flow diagram illustrating a method for performing a quiescence of producers according to one embodiment.

FIG. 5 is a flow diagram illustrating a method 500 for performing a quiescence of producers according to one embodiment. Method 500 begins at start point 502. At 504, a shared variable (i.e., shared by a plurality of producers and at least one consumer) for storing a last consumption time value (LastConsumptionTime) is established. At 506, a plurality of parallel producers each receives a partition, begins processing the received partition based on a received query, and begins producing output data that is stored in a buffer of the producer. At 508, at least one consumer begins consuming output data (e.g., taking data from the producer buffers and processing the data), and updates the shared variable with the current time each time that an element is taken by the consumer from the produced output data (e.g., each time "MoveNext" is called on the consumer's enumerator).

At 510 in method 500, the producers each periodically poll the shared variable, compare the last consumption time stored in the shared variable with the current time (CurrentTime), and determine if a threshold period of time (QuiescenceTimeout) has past since the last consumption time (i.e., (CurrentTime−LastConsumptionTime)>QuiescenceTimeout). At 512, when a producer blocks, the producer blocks with a timeout equal to CurrentTime−LastConsumptionTime, and the blocked producer automatically wakes after the blocking timeout period. At 514, when any producer determines at 510 that the QuiescenceTimeout period has been exceeded, or when a blocked producer wakes after a blocking timeout period, the producer places itself in a quiescent state. Method 500 ends at end point 516.

Figure 6:
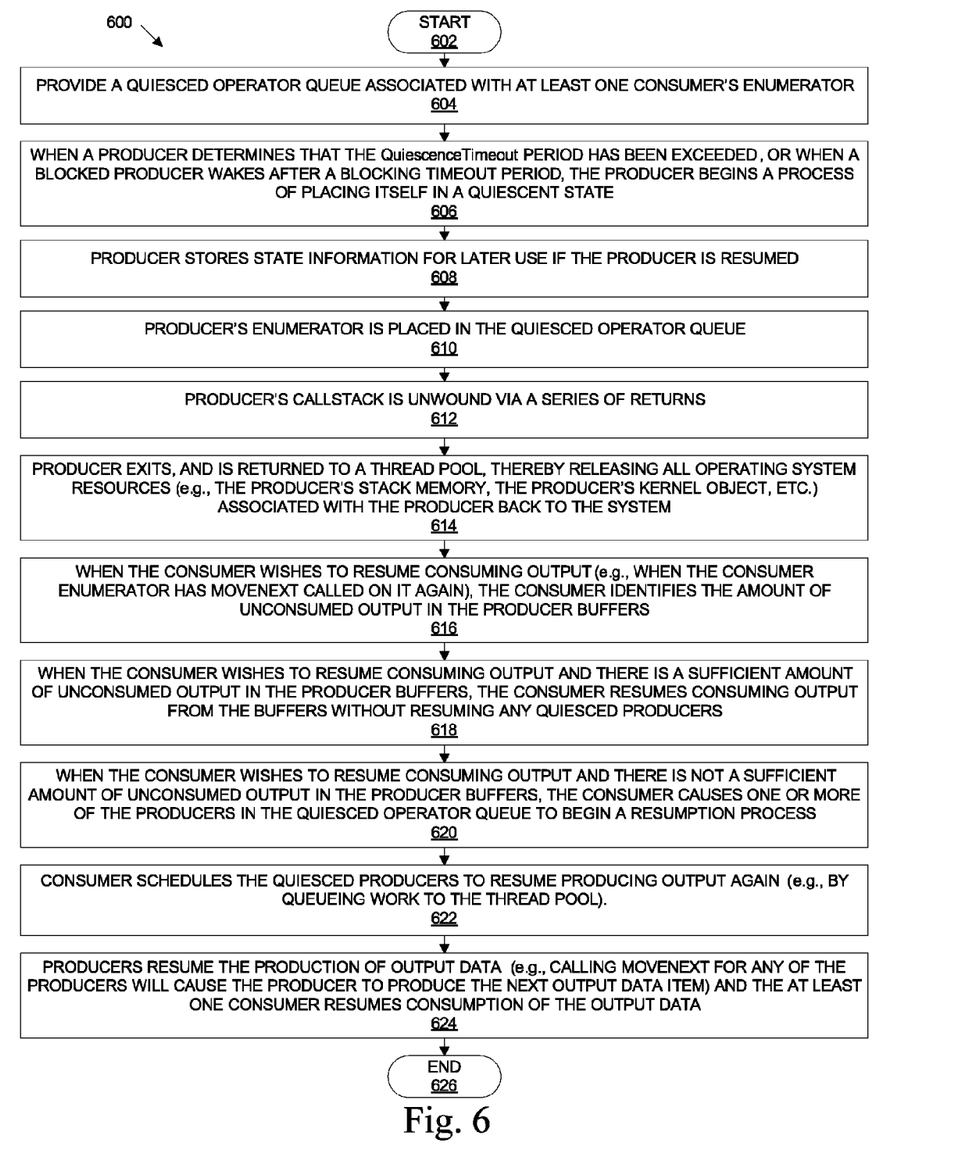
FIG. 6 is a flow diagram illustrating a method for placing a producer in a quiescent state and resuming the producer according to one embodiment.

FIG. 6 is a flow diagram illustrating a method 600 for placing a producer in a quiescent state and resuming the producer according to one embodiment. Method 600 begins at start point 602. At 604, a quiesced operator queue associated with at least one consumer's enumerator is provided. In one embodiment, a consumer uses the same enumerator object to access the output from all of the producers. At 606, when a producer determines that the QuiescenceTimeout period has been exceeded, or when a blocked producer wakes after a blocking timeout period, the producer begins a process of placing itself in a quiescent state. At 608, the producer stores state information for later use if the producer is resumed. At 610, the producer's enumerator is placed in the quiesced operator queue. At 612, the producer's callstack is unwound via a series of returns. At 614, the producer exits, and is returned to a "thread pool", thereby releasing all operating system resources (e.g., the producer's stack memory, the producer's kernel object, etc.) associated with the producer back to the system. In another embodiment, rather than returning to the thread pool at 614, the producer is destroyed.

A thread pool according to one embodiment provides an efficient way to manage threads. When an application wants to create a thread to perform a task, the application can request that the task be performed by a thread pool thread. The thread pool creates threads upon request. When a thread pool thread completes a task, the thread is not destroyed immediately, but rather is returned to the thread pool. If an application makes another request of the thread pool, an existing thread from the thread pool will be used to complete the task (i.e., rather than creating a new thread for every task).

Returning to method 600, at 616, when the consumer wishes to resume consuming output (e.g., when the consumer enumerator has MoveNext called on it again), the consumer identifies the amount of unconsumed output in the producer buffers. At 618, when the consumer wishes to resume consuming output and there is a sufficient amount of unconsumed output in the producer buffers, the consumer resumes consuming output from the buffers without resuming any quiesced producers. At 620, when the consumer wishes to resume consuming output and there is not a sufficient amount of unconsumed output in the producer buffers, the consumer causes one or more of the producers in the quiesced operator queue to begin a resumption process. At 622, the consumer schedules the quiesced producers to resume producing output again (e.g., by queueing work to the thread pool). At 624, the producers resume the production of output data (e.g., calling MoveNext for any of the producers will cause the producer to produce the next output data item) and the at least one consumer resumes consumption of the output data. Method 600 ends at end point 626.

In one embodiment of method 600, the identification of the amount of unconsumed output in the producer buffers at 616 is not performed, and the consumer causes resumption of quiesced producers whenever the consumer resumes consuming output.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A computer-readable storage medium storing computer-executable instructions for performing a method comprising:
    performing a parallel execution of a query with a plurality of producers using a partitioned data source, thereby producing output data;
    consuming the output data with at least one consumer;
    monitoring the at least one consumer;
    determining whether to stop producing output data by at least one of the producers prior to completion of the execution of the query based on the monitoring;
    placing at least one of the producers in a quiescent state when the monitoring indicates that the at least one consumer has stopped consuming output data for more than a threshold period of time, thereby causing the at least one producer placed in the quiescent state to stop producing output data; and
    providing a shared variable that stores a last consumption time value indicating a last time that the at least one consumer consumed output data.

2. The computer-readable medium of claim 1, wherein the at least one consumer runs concurrently with the plurality of producers.

3. The computer-readable medium of claim 1, wherein the method further comprises:
    storing produced output data in at least one bounded buffer, wherein the at least one consumer consumes output data from the at least one bounded buffer.

4. The computer-readable medium of claim 1, wherein the method further comprises:
    determining whether a cancellation event has occurred indicating that the at least one consumer will no longer consume any more output data; and
    performing a cancellation of the producers when a cancellation event occurs, thereby causing the producers to no longer produce any more output data.

5. The computer-readable medium of claim 1, wherein the method further comprises:
    setting a shared flag when a cancellation event occurs that indicates that the at least one consumer will no longer consume any more output data; and
    monitoring the shared flag with each of the producers.

6. The computer-readable medium of claim 5, wherein the method further comprises:
    each producer performing a cancellation of itself when the producer determines that the shared flag has been set, thereby causing the producer to no longer produce any more output data.

7. The computer-readable medium of claim 1, wherein the method further comprises:
    determining whether to place at least one of the producers in a quiescent state based on the monitoring.

8. The computer-readable medium of claim 1, wherein the method further comprises:
    causing producers in a quiescent state to exit the quiescent state and resume producing output data when the at least one consumer resumes consuming output data.

9. The computer-readable medium of claim 1, wherein the method further comprises:
    identifying an amount of output data that has been buffered by the producers but not yet consumed by the at least one consumer;
    causing the at least one consumer to resume consuming output data; and
    determining whether to cause producers in quiescent state to exit the quiescent state and resume producing output data based on the identified amount of output data.

10. The computer-readable medium of claim 1, wherein the method further comprises:
    periodically comparing a current time value with the last consumption time value with each of the producers; and
    causing a producer to enter a quiescent state when the producer determines that a difference between the current time value and the last consumption time value is greater than a threshold value, thereby causing the producer to stop producing output data.

11. The computer-readable medium of claim 1, wherein the method further comprises:
    generating an output set with each of the producers based on results of the execution of the query, thereby generating a plurality of output sets; and
    merging the plurality of output sets into a merged output set.

12. A method for performing a parallel execution of a query, the method comprising:
    receiving a query and that identifies an input data source;

partitioning the input data source into a partitioned data source comprising a plurality of partitions;

performing a parallel processing of the plurality of partitions using a plurality of producers, thereby producing output data; and consuming the output data with at least one consumer;

causing the producers to stop producing output data prior to completion of the parallel processing when the at least one consumer stops consuming output data for more than a threshold period of time; and providing a shared variable that stores a last consumption time value indicating a last time that the at least one consumer consumed output data.

13. The method of claim 12, and further comprising:

determining whether a cancellation event has occurred indicating that the at least one consumer will no longer consume any more output data; and performing a cancellation of the producers when a cancellation event occurs, thereby causing the producers to no longer produce any more output data.

14. The method of claim 12, and further comprising:

setting a shared flag when a cancellation event occurs that indicates that the at least one consumer will no longer consume any more output data;

monitoring the shared flag with each of the producers; and each producer performing a cancellation of itself when the producer determines that the shared flag has been set, thereby causing the producer to no longer produce any more output data.

15. The method of claim 12, and further comprising:

placing the producers in a quiescent state when the at least one consumer stops consuming output data for more than the threshold period of time, thereby causing the producers placed in the quiescent state to stop producing output data.

16. The method of claim 15, and further comprising:

causing producers in a quiescent state to exit the quiescent state and resume producing output data when the at least one consumer resumes consuming output data.

17. The method of claim 12, and further comprising:

periodically comparing a current time value with the last consumption time value with each of the producers; and causing a producer to enter a quiescent state when the producer determines that a difference between the current time value and the last consumption time value is greater than a threshold value, thereby causing the producer to stop producing output data.

18. A computer-readable storage medium storing computer-executable instructions for performing a method comprising:

performing a parallel execution of a query with a plurality of producers using a partitioned data source, thereby producing output data;

storing the produced output data in a plurality of buffers;

consuming the stored output data with at least one consumer concurrently with the execution of the query;

placing the producers in a quiescent state when the at least one consumer stops consuming output data for more than a threshold period of time, thereby causing the producers placed in the quiescent state to stop producing output data;

performing a cancellation of the producers when a cancellation event occurs that indicates that the at least one consumer will no longer consume any more output data, thereby causing the producers to no longer produce any more output data; and causing producers in a quiescent state to exit the quiescent state and resume producing output data when the at least one consumer resumes consuming output data.

* * * * *